Figure 1:
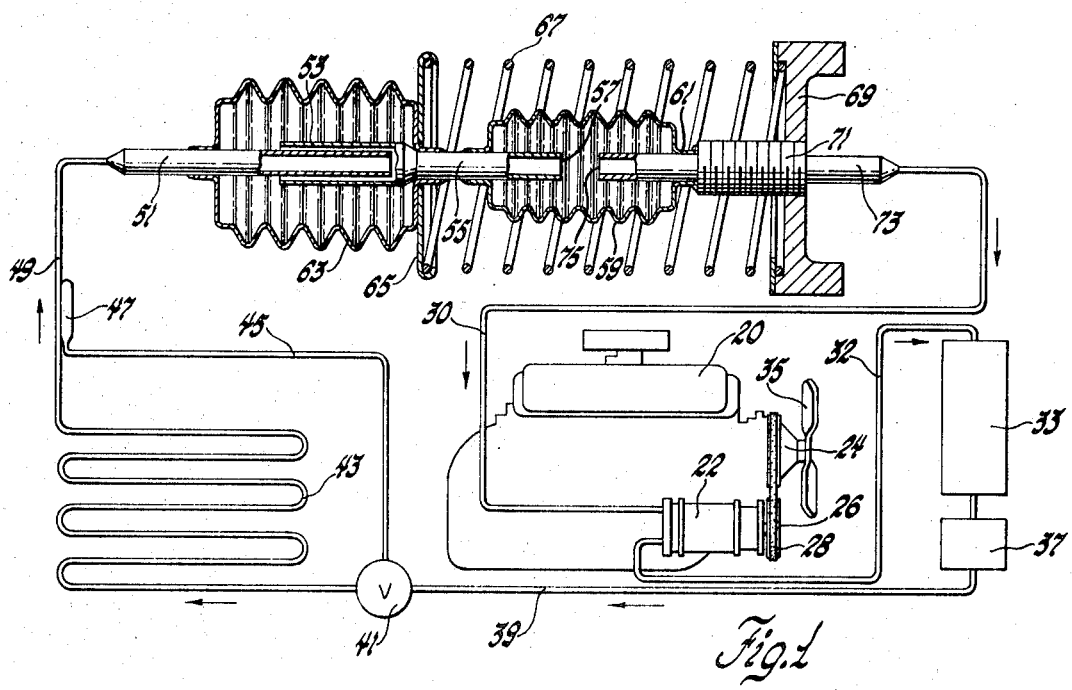

United States Patent

Mann

[15] 3,645,110
[45] Feb. 29, 1972

[54] TURBULENCE CONTROL

[72] Inventor: Leonard J. Mann, Kettering, Ohio
[73] Assignee: General Motors Corporation, Detroit, Mich.
[22] Filed: May 11, 1970
[21] Appl. No.: 36,191

[52] U.S. Cl. .............................................. 62/217, 62/323
[51] Int. Cl. .......................................................... F25b 41/04
[58] Field of Search ........................... 62/217, 197, 214, 323

[56] References Cited

UNITED STATES PATENTS

| | | | |
|---|---|---|---|
| 2,155,516 | 4/1939 | Tull | 62/217 |
| 3,041,848 | 7/1962 | Greenwald | 62/197 |
| 3,369,374 | 2/1968 | Miller | 62/197 |
| 3,498,074 | 3/1970 | Fineblum | 62/197 |

*Primary Examiner*—Meyer Perlin
*Attorney*—William S. Pettigrew, John C. Evans and Kenneth H. MacLean

[57] ABSTRACT

In the one preferred form, the exit and entrance ends of two portions of the suction conduit of an automobile air conditioning system are enclosed in a first flexible bellows. The portion connecting to the evaporator outlet is provided with a telescoping arrangement sealed within a second flexible bellows with the portion connecting to the evaporator being anchored. The other suction line portion is provided with a threaded adjustable spring support which supports one end of the coil spring extending to the spring retainer on the movable end of the second bellows. The expansion and contraction of the second bellows in response to the pressure applied by the telescoping connection moves the exit and entrance ends closer together or further apart to vary the turbulence of the flow between the exit and entrance to control the evaporating pressure and temperature within the evaporator.

In a second preferred form, a vane is moved by a bellows in response to either suction line or discharge line of pressure to increase the turbulence between the exit and entrance of the two portions of the suction line. The bellows may be provided with a spring adjustment for varying the pressure relationship.

2 Claims, 2 Drawing Figures

PATENTED FEB 29 1972

3,645,110

INVENTOR.
Leonard S. Mann
BY
Carl A. Stickel
ATTORNEY

TURBULENCE CONTROL

This invention pertains to suction line controls for automobile air-conditioning systems in which turbulence is varied to provide a suitable control without valves.

In automobile air-conditioning systems, the compressor is customarily driven directly from the the engine by a belt and operates at speeds proportional to the engine regardless of the refrigeration requirements. The engine is driven at speeds in accordance with driving conditions and the desires of the driver which are normally inconsistant of the demands of the refrigerating system which are more constant. It has been customary to provide various forms of suction line valves for preventing the evaporator temperatures from becoming cold enough to accumulate frost and to cause freezing of moisture on the evaporator. Such valves normally require precision manufacturing and are therefore relatively expensive.

It is an object of this invention to provide a suction line control in which a simple inexpensive means is provided to vary the turbulence between two portions of the suction line in accordance with either the evaporator pressure or the head pressure.

It is another object of this invention to provide a simple inexpensive control for preventing frosting of an evaporator by controlling the flow of refrigerant from the evaporator to the compressor without the use of a valve which requires machining and fitting.

It is another object of this invention to provide a simple inexpensive control for preventing frosting of an evaporator by varying the amount of turbulence in the flow of refrigerant between the evaporator and the compressor.

Further objects and advantages of the present invention will be apparent from the following description, reference being had to the accompanying drawings, wherein preferred embodiments of the present invention are clearly shown.

Figure 2:
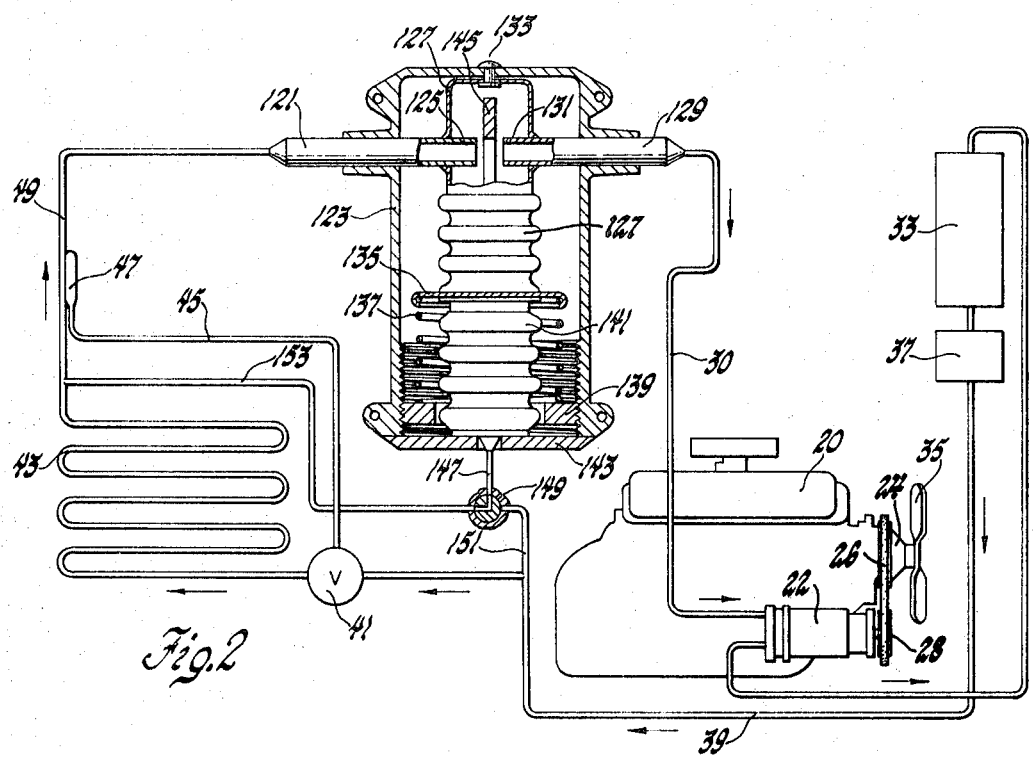

In the drawings:

FIG. 1 is a diagrammatic view of an automobile air-conditioning system embodying a turbulence control illustrating one form of my invention; and FIG. 2 is a diagrammatic view of an air-conditioning system embodying a second form of turbulence flow to illustrate a second form of my invention.

In the drawings, FIG. 1 shows a gasoline engine 20 for driving an automobile. The engine 20 is provided with a compressor 22 along side which is driven by the engine along with the fan pulley 24 through a belt 26 connected to the compressor driven pulley 28. The compressor 22 withdraws refrigerant from the suction conduit 30 and discharges the compressed refrigerant through the supply conduit 32 to the top of a condenser 33. The fan 35 is driven by the pulley 26 which circulates air in heat transfer with the condenser 33 located in the front of the automobile and particularly in front of the radiator in the inlet air opening thereon. The circulation of air in heat transfer with the condenser 33 causes the refrigerant to condense and collect in the receiver 37 having its outlet connected through the supply conduit 39 to the thermostatic expansion valve 41 which controls the flow of the refrigerant into the refrigerant evaporator 43. The valve 41 either in whole or in part, is controlled by a tube 45 connecting with the thermostat bulb 47 mounted in heat transfer with the initial portion 49 of the suction conduit connected to the outlet of the evaporator 43.

This portion of the suction conduit 49 includes a portion 51 which is held from movement and which has a telescoping connection with the larger portion 53 of a movable tube 55 having exit portion 57 located within the bellows 59 one end of which is sealed to the tube portion 55 and the other end is sealed as indicated by the reference character 61 to the second portion 30 of the suction conduit. The adjacent end of the first bellows 63 is connected to and sealed to the tube 55 and is movable therewith. The tube 55 is provided with a large spring retainer 65 mounted between the adjacent ends of the bellows 59 and 63. The spring retainer 65 has its rim curled around the final loop of a light large-diameter compression-type coil spring 67. The variations in pressure within the bellows 63 due to leakage of the refrigerant outside the telescoping joint moves the spring retainer to the right or left until a balanced condition is obtained. The spring 67 is retained at the opposite end by an adjustable spring retainer 69 which is threaded onto the short threaded portion 71 surrounding the second portion 73 of the suction line 30. This portion 73 and the threaded portion 71 are held from movement so that the spring support 69 may be turned about the threaded portion to move axially to change the spring force of the spring 67. A rise in pressure within the bellows 63 will move the spring retainer 65 and the tube 55. The tube 73 has an entrance portion within the bellows 59 spaced from but aligned with the exit portion 57.

When this exit and entrance 57,75 are widely spaced the turbulence in the flow from the exit to the entrance is increased thereby reducing the flow of refrigerant out of the evaporator 43 to maintain or increase the pressure therein. When the exit and entrance are closer together the turbulence is reduced and the flow is increased to reduce the pressure of the refrigerant in the evaporator 43. The increase in the pressure in the bellows 63 upon a rise in pressure within the evaporator 43 will move the portion of the bellows connected to the spring retainer and the tube 55 to the right thereby moving the exit 57 closed to the entrance 75 to reduce the turbulence and increase the flow to maintain the pressure within the evaporator 43 substantially constant. When the pressure falls within the evaporator 43 the bellows 63 will contract thereby allowing the spring 67 to move the spring retainer 65 and the tube 55 and the exit 57 to the left away from the entrance 75 to increase the turbulence in the flow between the exit 57 and the entrance 75 to reduce the rate of refrigerant flow out of the evaporator 43 to maintain or increase its pressure.

In the second form of the invention, the parts of the refrigerating system with the exception of the suction line control, bear the same reference characters. However, in FIG. 2 the first portion of the suction line terminates in a pipe 121 extending through wall of the control casing 123 and having an exit end 125 in the form of an open pipe end located within a flexible sealing bellows 127. The second portion 30 of the suction line has an entrance pipe 129 extending through the opposite side of the control casing 123 and is positioned to form an entrance 131 directly opposite to and in alignment with the exit 125. These two pipe portions 121 and 129 also extend in a sealing relation through opposite sides of the sealing bellows 127 having its upper end anchored by the rivet 133 to the top of the tension-type 123. The bottom of the sealing bellows 127 is connected to and sealed to the spring retainer 135 having its rim curled downwardly to hold the upper end of the tire coil spring 137. The bottom of the coil spring 137 is supported by a flat ring 139 which is made adjustable by being threaded into the wall of the casing 123.

Within the spring 137 is the principal operating bellows 141 which has its upper end sealed to the spring retainer 135 and it has its lower end supported on the bottom cap 143 of the casing 123. If it is desired that this bellows 141 should be the sole controlling force it is made to have the same effective diameter as the sealing bellows 127 as shown in FIG. 2. However, if it is desired to make either the bellows 141 or the bellows 127 responsive to the pressure within the casing 123, the bellows may be made of different sizes so as to make the operation responsive to the difference in effective area between the two. The spring retainer 135 has connected to it an inverted U-shaped vane 145 which in the low-turbulence position has its yoke above the exit and entrance 125 and 131.

The interior of the bellows 141 is connected by a tube 147 with a two way rotary valve 149 which in the position shown connects through the conduit 153 to the suction line 49 and which in its alternate position connects the conduit 147 with a conduit 151 connected to the conduit 39 connecting with the outlet of the condenser 33. In this position shown in FIG. 2, the bellows 141 is responsive to evaporator pressure and in the alternate position it is responsive to the condenser pressure. The pressure within the bellows 141 controls the position of the movable spring retainer 135 and the inverted U-shaped turbulence vane 145. When the pressure is high within the bellows 141 the vane 145 will be in the upper unobstructing position shown with the yoke of the U-shape above the pipes 121, 129. However, when the condenser pressure or the evaporator pressure is low, the bellows 141 will contract and move the vane 145 downward until the yoke of its U-shape moves more and more in between the exit 125 and the entrance 131 to gradually increase the turbulence in the flow between the two. This increase in turbulence results in less refrigerant flow out of the evaporator 43 thereby increasing the pressure therein to prevent the evaporator 43 form accumulating frost or ice which reduces its capacity for cooling.

In neither of these forms is it necessary to provide a machined valve and a machined valve seat in order that flow is completely stopped. The turbulence alone is sufficient to vary the flow in sufficient amounts to maintain the evaporator 43 slightly above water freezing temperatures to prevent accumulation of frost and ice thereon.

While the embodiments of the invention as herein disclosed constitute preferred forms, it is to be understood that other forms might be adopted.

I claim:

1. A refrigerating system including a compressor connected to a condenser and a flow control device and an evaporator connected to the condenser, wherein the improvement comprises a suction conduit having one portion connected to the outlet of the evaporator and having a second portion connected to the inlet of the compressor, a turbulence control means between the two portions comprising said one portion being provided with an exit, said second portion being provided with an entrance, said suction conduit also having an enclosure enclosing said exit and entrance, and means for varying the distance between said exit and said entrance to vary the rate of flow.

2. A refrigerating system including a compressor connected to a condenser and a flow control device and an evaporator connected to the condenser, wherein the improvement comprises a suction conduit having one portion connected to the outlet of the evaporator and having a second portion connected to the inlet of the compressor, a turbulence control means between said two portions comprising said one portion being provided with an exit, said second portion being provided with an entrance, said exit and said entrance being spaced from one another and aligned with respect to one another whereby fluid flow out of said exit is directed into said entrance, said suction conduit also having an enclosure enclosing said exit and entrance, a barrier between said spaced exit and entrance which is movable in a direction substantially normal to the fluid flow therebetween to vary the rate of fluid flow between said exit and said entrance.

* * * * *